(12) United States Patent
Kuramochi et al.

(10) Patent No.: US 9,031,740 B2
(45) Date of Patent: May 12, 2015

(54) VEHICLE CONTROL DEVICE CAPABLE OF CONTROLLER AREA NETWORK COMMUNICATION AND DIAGNOSTIC METHOD THEREFOR

(75) Inventors: Yuichi Kuramochi, Isesaki (JP); Hiroyuki Saito, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 807 days.

(21) Appl. No.: 13/049,247

(22) Filed: Mar. 16, 2011

(65) Prior Publication Data
US 2011/0231053 A1 Sep. 22, 2011

(30) Foreign Application Priority Data
Mar. 17, 2010 (JP) ................................. 2010-060142

(51) Int. Cl.
 G06F 19/00 (2011.01)
 H04L 12/40 (2006.01)
 H04L 12/24 (2006.01)
 H04L 12/26 (2006.01)

(52) U.S. Cl.
 CPC .... *H04L 12/40026* (2013.01); *H04L 12/40032* (2013.01); *H04L 41/0659* (2013.01); *H04L 43/0811* (2013.01); *H04L 2012/40215* (2013.01)

(58) Field of Classification Search
 USPC .................................................... 701/29, 36
 See application file for complete search history.

(56) References Cited

U.S. PATENT DOCUMENTS 5,428,813 A * 6/1995 Simmering et al. ............ 712/38

FOREIGN PATENT DOCUMENTS

| JP | 8-328602 A | 12/1996 |
| JP | 2004-122942 A | 4/2004 |
| JP | 2007-283788 A | 11/2007 |

OTHER PUBLICATIONS

Japanese Office Action with English Translation dated Jun. 19, 2012 (four (4) pages).

* cited by examiner

*Primary Examiner* — John Q Nguyen
*Assistant Examiner* — Kyung Kim
(74) *Attorney, Agent, or Firm* — Crowell & Moring LLP

(57) ABSTRACT

The present invention relates to a vehicle control device that is communicably connected to other control devices so that controller area network (CAN) communication can be performed through a communication bus and a diagnostic method thereof. The vehicle control device includes a CAN data transmission unit that can generate and transmit CAN data, a transmission stop unit that stops transmission of the CAN data transmitted from the CAN data transmission unit to the communication bus when a transmission stop signal is inputted, an abnormality detection unit that outputs the transmission stop signal to the transmission stop unit when detecting an abnormality in the vehicle control device, and a diagnostic unit that causes the abnormality detection unit to output the transmission stop signal regardless of the detection of abnormality, causes the CAN data transmission unit to transmit the CAN data, and diagnoses a transmission stop function that stops the transmission of the CAN data to the communication bus on the basis of a result of comparison between the transmitted CAN data and data on the communication bus.

8 Claims, 4 Drawing Sheets

| DATA ID | DATA (DATA LENGTH 4 BYTES) | TRANSMISSION CYCLE | TRANSMITTING UNIT | RECEIVING UNIT |
|---|---|---|---|---|
| 123 | 12_34_56_78 | 100ms | A | B,C |
| 456 | 9A_AB_CD_EF | 50ms | B | C |
| 789 | F1_12_23_34 | 80ms | C | A |
| ⋮ | ⋮ | ⋮ | ⋮ | ⋮ |
| 9AB | 45_67_23_9A | 70ms | N | A,B |
| ⋮ | ⋮ | ⋮ | ⋮ | ⋮ |

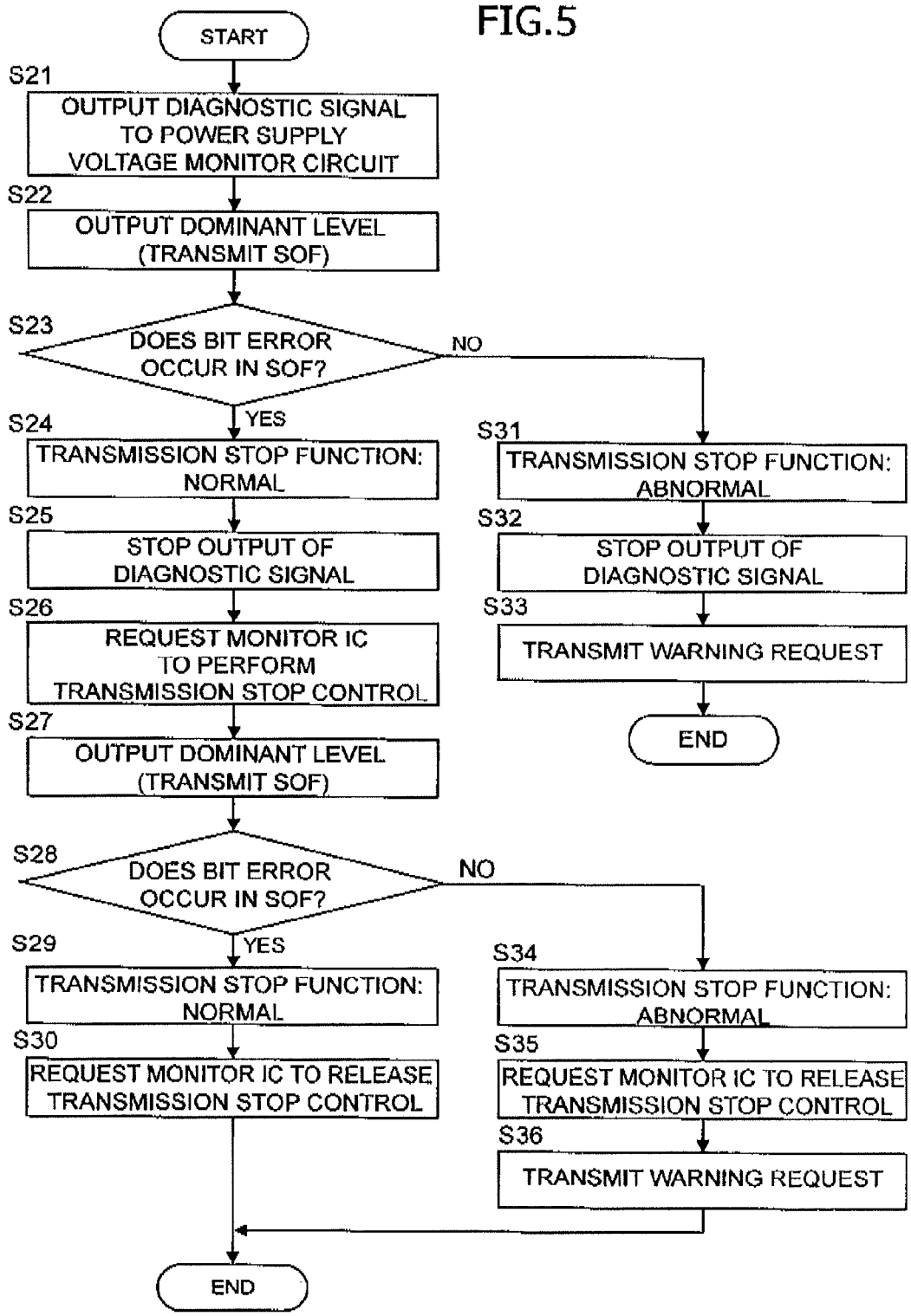

VEHICLE CONTROL DEVICE CAPABLE OF CONTROLLER AREA NETWORK COMMUNICATION AND DIAGNOSTIC METHOD THEREFOR

BACKGROUND OF THE INVENTION

1. Field of the Invention

The present invention relates to a vehicle control device and to a diagnostic method therefor, and especially relates to a vehicle control device that is communicably connected to other control devices so that CAN (Controller Area Network) communication can be performed through a communication bus and a diagnostic method therefor.

2. Description of Related Art

It was known that, in a vehicle control device that uses CAN communication, the vehicle control device includes a main control means and a sub control means and stops a transmission output of control information from the main control means to other control devices through a CAN communication line when the sub control means detects an abnormality of the main control means (for example, refer to Japanese Patent Application Publication No. 2004-122942).

However, the above conventional vehicle control device is based on the assumption that its transmission stop function that stops the transmission output of the control information operates properly, and a case in which the transmission stop function has an abnormality is not considered. Therefore, a response may be delayed when an abnormality occurs in the transmission stop function. As a result, even when the transmission output of control information is tried to be stopped, there may be a risk that the control information is actually transmitted to other control devices.

SUMMARY OF THE INVENTION

According to an aspect of the present invention, a vehicle control device that is communicably connected to other control devices so that CAN (Controller Area Network) communication can be performed through a communication bus includes (a) a CAN data transmission unit that generates and transmits CAN data, (b) a transmission stop unit that stops transmission of the CAN data transmitted from the CAN data transmission unit to the communication bus when a transmission stop signal is inputted, (c) an abnormality detection unit that outputs the transmission stop signal to the transmission stop unit when detecting an abnormality in the vehicle control device, and (d) a diagnostic unit that causes the abnormality detection unit to output the transmission stop signal regardless of detection of abnormality in the vehicle control device, causes the CAN data transmission unit to transmit the CAN data, and diagnoses a transmission stop function that stops the transmission of the CAN data to the communication bus on the basis of a result of comparison between the transmitted CAN data and data on the communication bus.

Another aspect of the present invention is a diagnostic method of a vehicle control device that is communicably connected to other control devices so that CAN (Controller Area Network) communication can be performed through a communication bus, the vehicle control device including a CAN data transmission unit that can generate and transmit CAN data, a transmission stop unit that stops transmission of the CAN data transmitted from the CAN data transmission unit to the communication bus when a transmission stop signal is inputted, and an abnormality detection unit that outputs the transmission stop signal to the transmission stop unit when detecting an abnormality in the vehicle control device, and the diagnostic method of the vehicle control device includes, causing the abnormality detection unit to output the transmission stop signal regardless of detection of abnormality in the vehicle control device and stopping the transmission of the CAN data to the communication bus, causing the CAN data transmission unit to transmit the CAN data while stopping the transmission of the CAN data to the communication bus, and diagnosing a transmission stop function that stops the transmission of the CAN data to the communication bus on the basis of a result of comparison between the CAN data transmitted by the CAN data transmission unit and data on the communication bus.

BRIEF DESCRIPTION OF THE DRAWINGS

FIG. 5 is a flowchart of a diagnostic control of a CAN data transmission stop function performed in the vehicle control device according to the second embodiment.

DESCRIPTION OF THE PREFERRED EMBODIMENTS

Hereinafter, embodiments of the present invention will be described with reference to the accompanying drawings.

Figure 1:
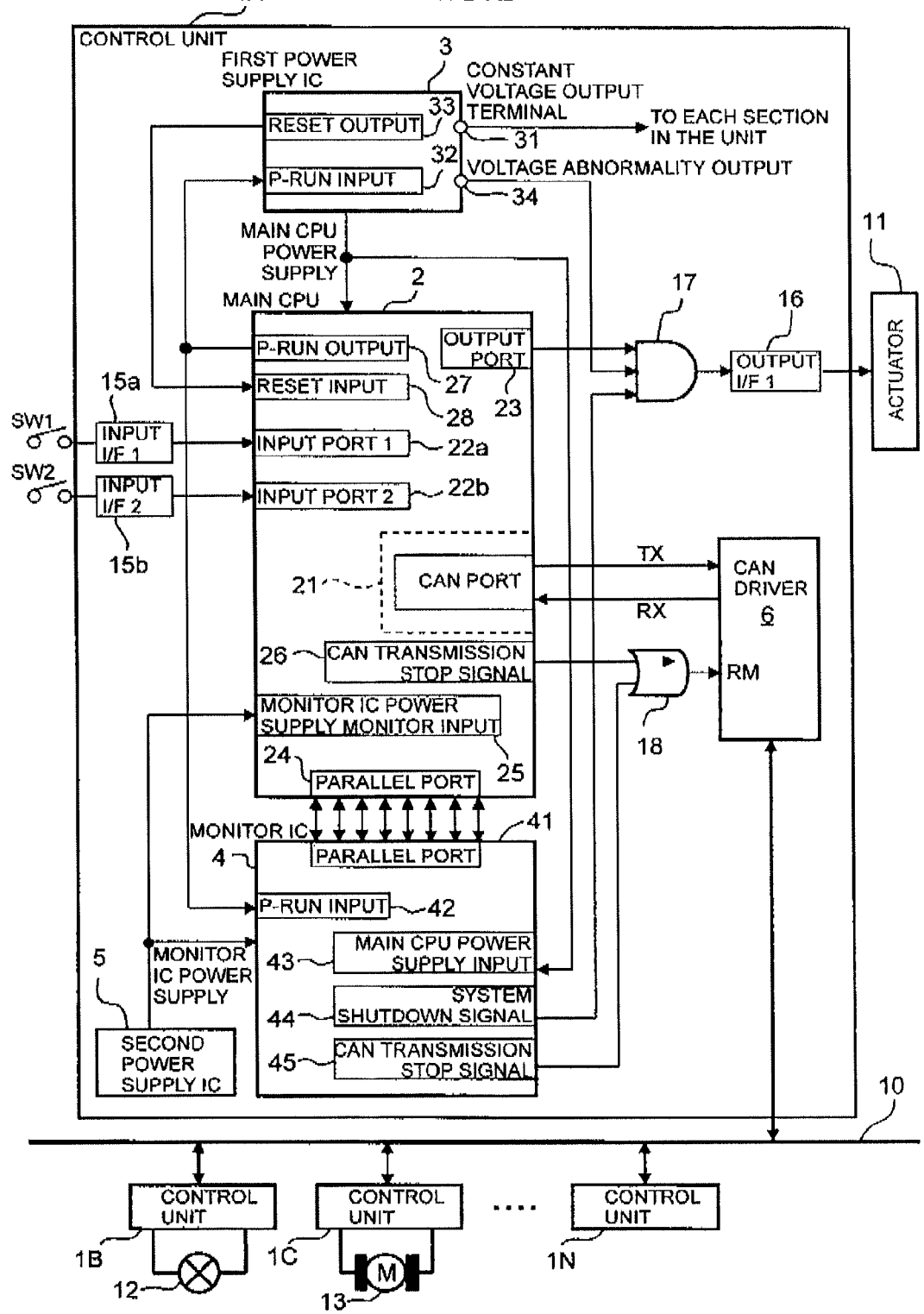
FIG. 1 is a diagram showing a schematic configuration of an entire communication system of a vehicle including a vehicle control device according to a first embodiment of the present invention.

FIG. 1 is a diagram showing a schematic configuration of an entire communication system of a vehicle including a vehicle control device according to a first embodiment of the present invention. As shown in FIG. 1, the vehicle control device (control unit) 1A according to this embodiment is communicably connected to plural other control devices (control units) 1B to 1N via a communication bus (CAN bus) 10 so that CAN (Controller Area Network) communication can be performed between each other.

Control units 1A to 1N operates and controls devices and mechanisms connected thereto. Control units 1A to 1N include various control units such as a control device of a brake assist device, a control device of an electric power steering mechanism, a control device of an antilock brake mechanism, a control device of a vehicle stability control mechanism, and an engine control unit. In this embodiment, control unit 1A controls an actuator 11, control unit 1B controls an abnormality alarm lamp 12, and control unit 1C controls a motor 13. Since control units 1A to 1N have substantially the same configuration, control unit 1A will be described here, and descriptions of the other control units 1B to 1N will be omitted.

As shown in FIG. 1, control unit 1A includes a main CPU (Central Processing Unit) 2, a first power supply IC 3, a monitor IC 4 as a sub CPU, a second power supply IC 5, and a CAN driver (or CAN transceiver) 6.

Main CPU 2 contains a CAN controller 21, controls actuator 11 connected thereto, and performs communication control in accordance with a CAN protocol.

Main CPU 2 calculates an operation amount of actuator 11 on the basis of signals inputted into input ports 22*a* and 22*b* via input interfaces 15*a* and 15*b*, and outputs the calculation result from an output port 23 to actuator 11 as a drive signal. The outputted drive signal is provided to actuator 11 via an output interface 16. Main CPU 2 also performs various calculations other than the calculation of the operation amount of actuator 11, and outputs various calculation results including the drive signal and a request signal from a parallel port 24 to monitor IC 4.

Main CPU 2 (more specifically, CAN controller 21 embedded in main CPU 2) is connected to CAN driver 6 via a transmission line Tx and a reception line Rx. Main CPU 2 generates CAN data (data frame) and transmits the CAN data to other control units via the CAN driver and communication bus 10, and main CPU 2 receives CAN data from other control units via CAN driver 6 and extracts data or the like. Main CPU 2 detects various errors associated with transmission and reception of CAN data.

A signal outputted from monitor IC 4 is inputted into main CPU 2 from parallel port 24, and a power supply voltage supplied to monitor IC 4 is inputted from a monitor input terminal 25 of a monitor IC power supply. When main CPU 2 detects an abnormality in monitor IC 4, such as the power supply voltage supplied to monitor IC 4 indicates an abnormal value, main CPU 2 outputs a transmission stop signal that causes CAN driver 6 to stop transmission of CAN data to communication bus 10 from a signal output terminal (hereinafter referred to as "first signal output terminal") 26.

Main CPU 2 further includes a P-RUN output terminal 27 that outputs a P-RUN signal to first power supply IC 3 and monitor IC 4, and a RESET input terminal 28 into which a RESET signal from first power supply IC 3 is input.

First power supply IC 3 supplies a power supply voltage to main CPU 2 and supplies a constant voltage to each section in control unit 1A from a constant voltage output terminal 31.

First power supply IC 3 has a watchdog function and monitors the P-RUN signal inputted from a P-RUN input terminal 32, and first power supply IC 3 resets main CPU 2 by outputting the RESET signal from a RESET output terminal 33 in such a case where main CPU 2 runs away. First power supply IC 3 has an abnormal voltage detection function and outputs a voltage abnormality output signal from a signal output terminal (hereinafter referred to as "second signal output terminal") 34 when an abnormality occurs in the voltage to be outputted.

Monitor IC 4 as a sub CPU monitors an operation state of main CPU 2 on the basis of calculation results of main CPU 2 and the power supply voltage supplied from first power supply IC 3 to main CPU 2.

Various calculation results of main CPU 2 are inputted into monitor IC 4 from a parallel port 41, the P-RUN signal from CPU 2 is inputted into monitor IC 4 from a P-RUN input terminal 42, and the power supply voltage supplied to main CPU 2 is inputted into monitor IC 4 from a main CPU power supply input terminal 43.

Monitor IC 4 monitors the inputted calculation results of main CPU 2, the P-RUN signal, and the power supply voltage of main CPU 2. When monitor IC 4 detects an abnormality in main CPU 2, monitor IC 4 outputs a system shutdown signal from a signal output terminal (hereinafter referred to as "third signal output terminal") 44 and outputs the transmission stop signal from a signal output terminal (hereinafter referred to as "fourth signal output terminal") 45.

When a request signal requesting an output of the transmission stop signal is inputted into monitor IC 4 from main CPU 2, regardless of detection of abnormality in main CPU 2, monitor IC 4 outputs the transmission stop signal from the fourth signal output terminal 45.

Second power supply IC 5 supplies a power supply voltage to monitor IC 4.

CAN driver 6 is provided between main CPU 2 and communication bus 10. CAN driver 6 transmits CAN data transmitted to the transmission line Tx from main CPU 2 to communication bus 10 and transmits CAN data transmitted from the other control units through communication bus 10 to the reception line Rx. When the transmission stop signal is inputted into CAN driver 6, CAN driver 6 stops (shuts down) transmission of the CAN data transmitted from main CPU 2 to communication bus 10 until a transmission stop clear signal is inputted. Hereinafter, a state in which CAN driver 6 stops (shuts down) transmission of CAN data to communication bus 10 by an input of the transmission stop signal is referred to as "CAN data transmission stop state".

A first logic circuit 17 is provided between main CPU 2 and output interface 16. Input sides of first logic circuit 17 are connected to output port 23 of main CPU 2, second signal output terminal 34 of first power supply IC 3, and third signal output terminal 44 of monitor IC 4, and first logic circuit 17 shuts down transmission of the drive signal of actuator 11 when at least either one of the voltage abnormality output signal from first power supply IC 3 and the system shutdown signal from monitor IC 4 is inputted.

In this way, at least when there is an abnormality in main CPU 2, the drive signal of actuator 11 is not transmitted to output interface 16, so that the drive of actuator 11 is stopped.

A second logic circuit 18 is provided at the input side of CAN driver 6. Input sides of second logic circuit 18 are connected to the first signal output terminal 26 of main CPU 2 and fourth signal output terminal 45 of monitor IC 4, and second logic circuit 18 transmits the transmission stop signal to CAN driver 6 when the transmission stop signal is inputted from either one of the signal output terminals.

In this way, when there is an abnormality in at least one of main CPU 2 and monitor IC 4, transmission of CAN data to communication bus 10 (and further to other control units) is stopped.

As described above, in control unit 1A, main CPU 2 and monitor IC 4 monitor each other whether the other side operates properly or is in a normal operating state, and the drive of actuator 11 is stopped and the transmission of CAN data to communication bus 10 is stopped by CAN driver 6 when monitor IC 4 detects an abnormal operation of main CPU 2 (specifically, abnormality of main CPU 2 and/or first power supply IC 3). In addition, the transmission of CAN data to communication bus 10 is stopped by CAN driver 6 when main CPU 2 detects an abnormal operation of monitor IC 4 (specifically, abnormality of monitor IC 4 and/or second power supply IC 5).

Figures 2, 3:
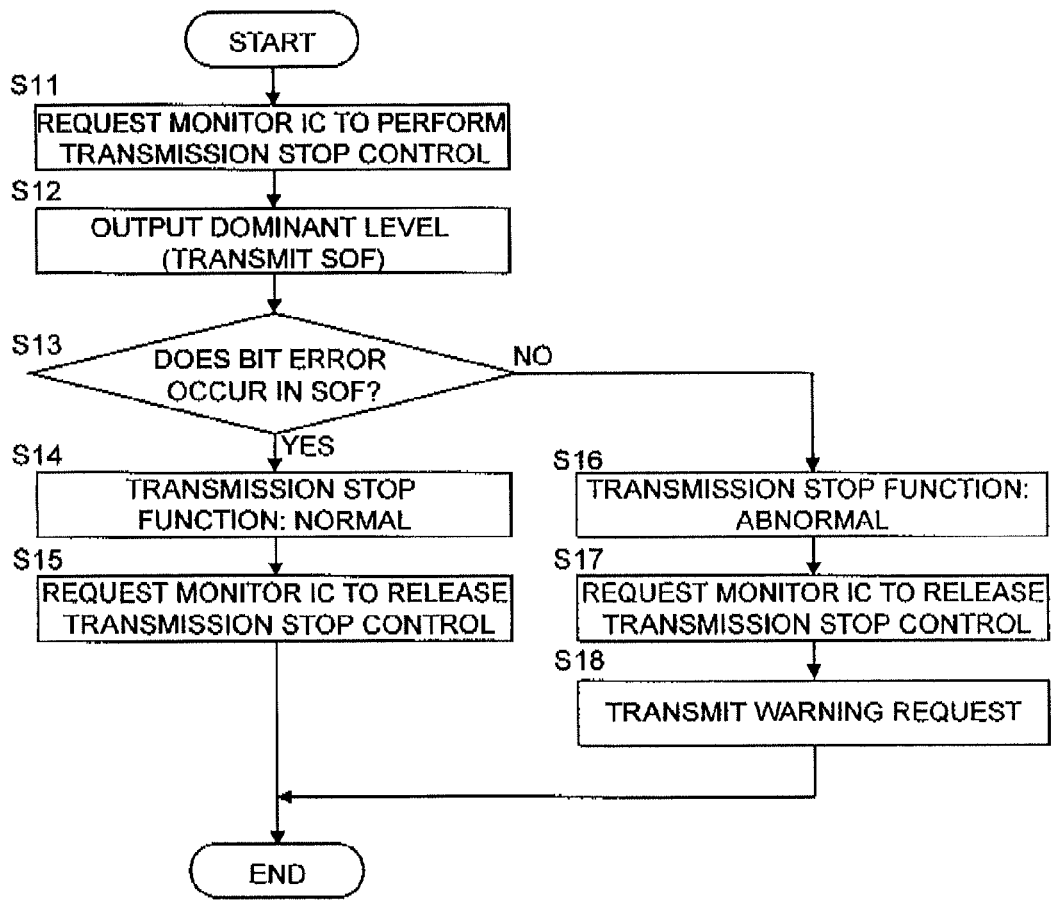
FIG. 2 is a diagram for explaining CAN data transmitted and received between control devices.
FIG. 3 is a flowchart of a diagnostic control of a CAN data transmission stop function performed in the vehicle control device according to the first embodiment.

FIG. 2 shows an example of CAN data transmitted and received between control units 1A to 1N.

As shown in FIG. 2, an ID is given to each data, and data length, transmission cycle, transmitting unit, and receiving unit are set to each data. The configuration of CAN data (specifically, data frame) is publicly known, so that the description will be omitted.

For example, CAN data of ID 123 is transmitted from control unit 1A to control unit 1B and control unit 1C at a transmission cycle of 100 (ms), and CAN data of ID 789 is transmitted from control unit 1C to control unit 1A at a transmission cycle of 80 (ms). In other words, each control unit transmits predetermined CAN data to other control units at a predetermined cycle.

Here, when the transmission of CAN data to communication bus 10 is stopped in control unit 1A, data of ID 123 is not transmitted to control unit 1B and control unit 1C. As a result, the data of ID 123 is not updated in control unit 1B and control unit 1C even if the transmission cycle has passed. In this way, control unit 1B and control unit 1C can determine that an abnormality occurs in control unit 1A, and can perform a predetermined control such as a fail-safe control on the basis of the determination. For example, control unit 18 can light up abnormality alarm lamp 12 and notify a user of the abnormality of control unit 1A. Alternatively, control unit 1C can stop (prohibit) drive of motor 13 and perform a fail-safe control. When actuator 11 is a motor, motor 13 controlled by control unit 1C can be used as substitute for actuator 11.

In this way, control unit 1A diagnoses whether or not there is an abnormality (detects an abnormality) in the unit, and, when detecting an abnormality, stops the transmission of CAN data to cause other control units to detect the abnormality of itself. Based on this, for example, the other control units or the entire system can immediately move to fail-safe.

As described above, control unit 1B and control unit 1C can be caused to detect an abnormality of control unit 1A when CAN data is not transmitted from control unit 1A (when control unit 1B and control unit 1C do not receive CAN data from control unit 1A). However, for example, in a case where there is an abnormality in the CAN data transmission stop function of CAN driver 6, there may be a risk that the CAN data is actually transmitted to control unit 1B and control unit 1C even when main CPU 2 or monitor IC 4 outputs the transmission stop signal. In this case, control unit 1B and control unit 1C cannot detect the abnormality in control unit 1A, so that it may be delayed to light up the abnormality alarm lamp for notifying of the abnormality and perform the fail-safe control.

Therefore, control unit 1A according to this embodiment diagnoses the CAN data transmission stop function that stops transmission of CAN data to communication bus 10, so that it is possible to immediately respond to a case in which the transmission stop function has an abnormality, and the delay of the fail-safe control or the like in the other control units or the entire system is reduced.

FIG. 3 is a flowchart showing diagnosis processing of the CAN data transmission stop function performed by main CPU 2 in this embodiment. This diagnosis processing is performed when control unit 1A is started (for example, when an ignition switch is turned on). However, it is not limited to this, and the diagnosis processing can be performed at any timing (preferably just before the vehicle starts to move).

In FIG. 3, a transmission stop control is requested to monitor IC 4 in step S11.

Specifically, main CPU 2 transmits a request signal for requesting an output of the transmission stop signal to monitor IC 4. Based on this, monitor IC 4 outputs the transmission stop signal to CAN driver 6 regardless of presence or absence of abnormality in main CPU 2.

In step S12, a 1-bit dominant level is outputted. Specifically, SOF (Start Of Frame) which is a first portion of CAN data that is transmitted.

In step S13, it is determined whether or not a bit error occurs in an SOF area. As described above, main CPU 2 contains CAN controller 21, and has a function to compare and monitor a signal level transmitted by itself and a signal level on communication bus 10 over the entire area of the data frame (bit monitoring). By this function, main CPU 2 compares the SOF (specifically, dominant level) transmitted by itself and data on communication bus 10, and determines that a bit error occurs in the SOF area when there is a difference between them. The process proceeds to step S14 when the bit error occurs in the SOF area, and the process proceeds to step S16 when the bit error does not occur in the SOF area.

In step S14, it is confirmed that the transmission stop function is normal.

Since the transmission stop signal is outputted to CAN driver 6 in step S11, the transmission of the CAN data must be stopped. In this state, the SOF (dominant level) is not made transmitted to communication bus 10, so that communication bus 10 is still in a recessive level (bus idle) and a bit error occurs in the SOF area. Therefore, due to the bit error in the SOF area, it is possible to confirm that the CAN data transmission stop function operates properly.

In step S15, cancel of the transmission stop control is requested to monitor IC 4.

Specifically, main CPU 2 transmits a request signal for requesting an output of a transmission stop clear signal to monitor IC 4. Based on this, monitor IC 4 outputs the transmission stop clear signal to CAN driver 6, and the CAN driver starts (restarts) transmission of CAN data to communication bus 10.

In step S16, it is confirmed that there is an abnormality in the transmission stop function.

As described above, since a bit error must occur in the SOF area, it is considered that the CAN data transmission stop function does not operate properly when the bit error does not occur in the SOF area. Therefore, due to no bit error in the SOF area, it is possible to confirm that there is an abnormality in the CAN data transmission stop function. Note that the abnormality exists in the CAN data transmission stop function, i.e. a function to stop transmission of CAN data to communication bus 10, so that CAN data can be transmitted in most cases even when the abnormality exists in the transmission stop function.

In step S17, in the same manner as in step S15, cancel of the transmission stop control is requested to monitor IC 4, and a warning request is transmitted in step S18. This warning request is a request to notify a driver or the like that the transmission stop function of control unit 1A has the abnormality, for example, to cause control unit 1B to light up abnormality alarm lamp 12. However, it is not limited to this, and it is possible to notify a user or the like that the transmission stop function has the abnormality by any other method.

By the above diagnosis processing, it is possible to check whether or not the CAN data transmission stop function in the control unit operates normally, and an abnormality is notified to a driver or the like when there is the abnormality in the CAN data transmission stop function, so that immediate action to deal with the abnormality of the transmission stop function can be taken.

Additionally, in the above embodiment, although the monitor IC 4 outputs the transmission stop signal (step S11), main CPU 2 may output the transmission stop signal instead of monitor IC 4 or in addition to monitor IC 4. In this case, the CAN data transmission stop function can be also diagnosed.

However, it is preferred that the diagnosis processing be performed by causing monitor IC 4 to output the transmission stop signal in light of (1) it is considered that stopping transmission of CAN data to communication bus 10 is mostly made in a case where monitor IC 4 detects an abnormality in main CPU 2, (2) it is possible to diagnose the transmission stop function including a diagnosis of the output of the transmission stop signal of monitor IC 4, and (3) it is considered that the transmission stop function will operate properly by the transmission stop signal from main CPU 2 due to the proper operation of the transmission stop function by the transmission stop signal from monitor IC 4.

In the above embodiment, although main CPU 2 contains CAN controller 21, CAN controller 21 may be separated from main CPU 2.

In the above embodiment, main CPU 2 (CAN controller 21) functions as "CAN data transmission unit" or "CAN data transmission means" of the present invention, CAN driver 6 functions as "transmission stop unit" or "transmission stop means" of the present invention, monitor IC 4 or main CPU 2 functions as "abnormality detection unit" or "abnormality detection means" of the present invention, and main CPU 2 functions as "diagnostic unit" or "diagnostic means" of the present invention.

Figure 4:
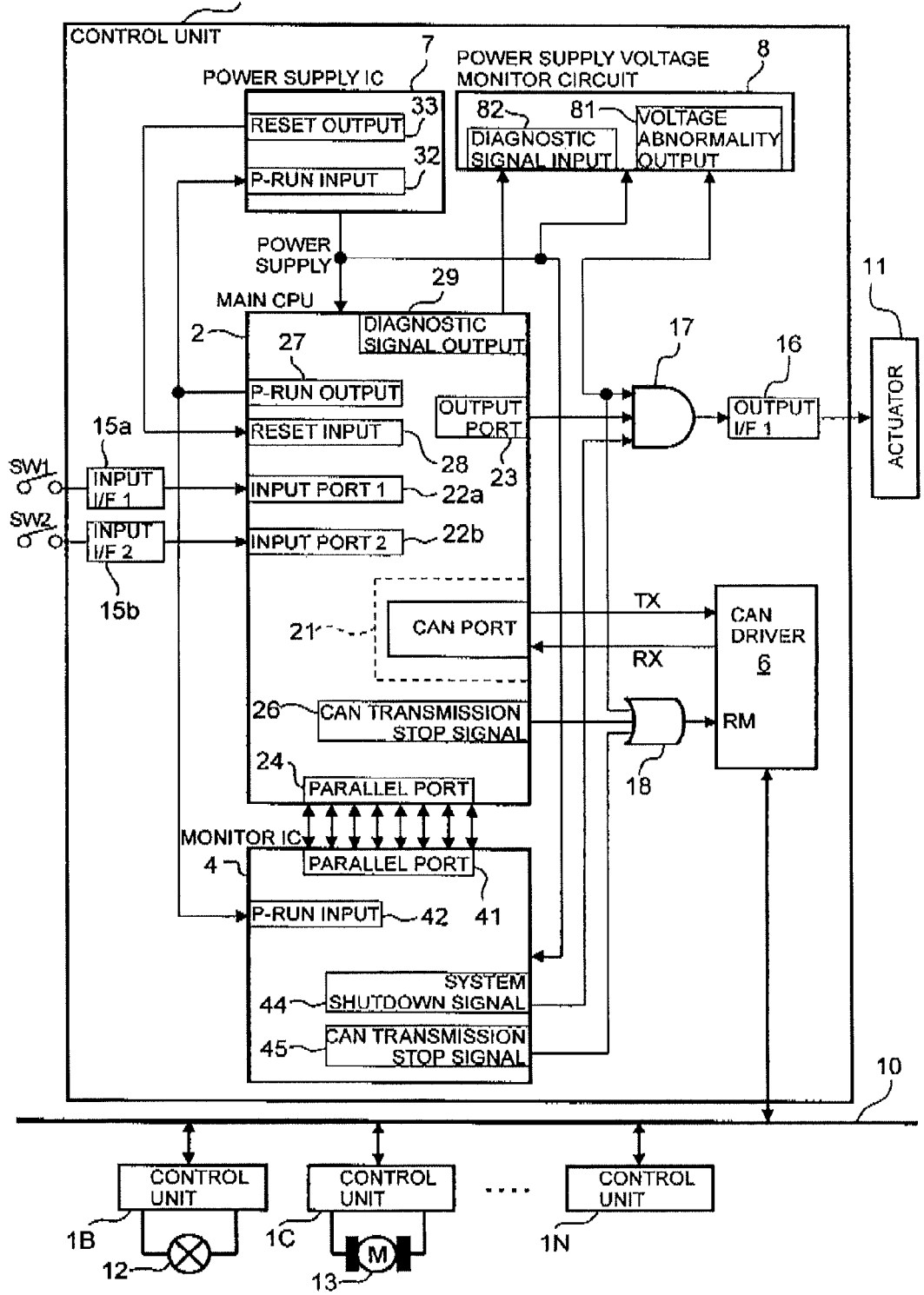
FIG. 4 is a diagram showing a schematic configuration of an entire communication system of a vehicle including a vehicle control device according to a second embodiment of the present invention.

FIG. 4 is a diagram showing a schematic configuration of an entire communication system of a vehicle including a vehicle control device according to a second embodiment of the present invention.

In FIG. 4, components having the same function as those in the vehicle control device according to the first embodiment (refer to FIG. 1) are given the same reference numerals, and the description thereof will be omitted. Basic differences from the vehicle control device according to the first embodiment is that a single power supply IC 7 supplies a power supply voltage to main CPU 2 and monitor IC 4 in a control unit according to this embodiment, and that a power supply voltage monitor circuit 8 that monitors the power supply voltage supplied by power supply IC 7.

Power supply IC 7 supplies the power supply voltage to main CPU 2 and monitor IC 4. In the same manner as first power supply IC 3 in FIG. 1, power supply IC 7 includes a P-RUN input terminal 32 and a RESET output terminal 33, and outputs a RESET signal to reset main CPU 2 in a case where it is determined that main CPU 2 runs away. Power supply IC 7 corresponds to "power supply voltage supply circuit" of the present invention.

Power supply voltage monitor circuit 8 is connected to a power supply voltage supply line of power supply IC 7, and monitors power supply voltage supplied from power supply IC 7 to main CPU 2 and monitor IC 4. When power supply voltage monitor circuit 8 detects an abnormality of the power supply voltage supplied to monitor IC 4, power supply voltage monitor circuit 8 outputs a voltage abnormality detection signal from a signal output terminal (hereinafter referred to "fifth signal output terminal") 81. Here, the voltage abnormality detection signal outputted from power supply voltage monitor circuit 8 has a function the same as that of the voltage abnormality output signal outputted from first power supply IC 3 and the same function as that of the transmission stop signal outputted from main CPU 2 and monitor IC 4 in the first embodiment. Therefore, the voltage abnormality detection signal outputted from power supply voltage monitor circuit 8 can be represented as the transmission stop signal.

Power supply voltage monitor circuit 8 includes a signal input terminal 82 into which a diagnostic signal is inputted. The diagnostic signal is to cause an abnormality in the power supply voltage monitored by power supply voltage monitor circuit 8, and outputted from a diagnostic signal output terminal 29 of main CPU 2. When main CPU 2 outputs the above-mentioned diagnostic signal, a pseudo abnormality can be generated in the power supply voltage supplied from power supply IC 7, and power supply voltage monitor circuit 8 outputs the voltage abnormality detection signal. The diagnostic signal corresponds to "second request signal" of the present invention.

Therefore, in this embodiment, the power supply voltage monitor function of the power supply voltage monitor circuit 8 can be diagnosed by checking the voltage abnormality detection signal of power supply voltage monitor circuit 8 when main CPU 2 outputs the diagnostic signal, for example.

In this embodiment, input sides of first logic circuit 17 are connected to output port 23 of main CPU 2, third signal output terminal 44 of monitor IC 4, and fifth signal output terminal 81 of power supply voltage monitor circuit 8, and first logic circuit 17 shuts down transmission of drive signal of actuator 11 when at least one of the system shutdown signal from monitor IC 4 and the voltage abnormality output signal from power supply voltage monitor circuit 8 is inputted.

In this way, in the same manner as in the first embodiment, at least when there is an abnormality in an operation state of main CPU 2, the drive of actuator 11 is stopped.

In this embodiment, instead of second logic circuit 18, a third logic circuit 19 is provided at the input side of CAN driver 6. Input sides of third logic circuit 19 are connected to first signal output terminal 26 of main CPU 2, fourth signal output terminal 45 of monitor IC 4, and fifth signal output terminal 81 of power supply voltage monitor circuit 8, and third logic circuit 19 transmits the transmission stop signal to CAN driver 6 when the transmission stop signal (including the voltage abnormality output signal from power supply voltage monitor circuit 8) is inputted from any one of the signal output terminals.

In this way, in the same manner as in the first embodiment, when there is an abnormality in at least either one of main CPU 2 and monitor IC 4, transmission of CAN data to communication bus 10 (and further to other control units) is stopped.

By using such a configuration, also in this embodiment, control unit 1A detects an abnormality in the unit, and when, detecting an abnormality, stops the transmission of CAN data to cause other control units to detect the abnormality of itself. In this way, not only the other control units but also the entire system can immediately move to fail-safe.

FIG. 5 is a flowchart showing diagnosis processing of the CAN data transmission stop function performed by the main CPU 2 in this embodiment. In the same way as the diagnosis processing (FIG. 3) in the first embodiment, this diagnosis processing is performed, for example, when control unit 1A is started (for example, when an ignition switch is turned on).

In FIG. 5, a diagnostic signal is outputted to power supply voltage monitor circuit 8 in step S21. Based on this, a pseudo abnormality is generated in the power supply voltage supplied from power supply IC 7, and the voltage abnormality detection signal is outputted from power supply voltage monitor circuit 8.

In step S22, a 1-bit dominant level is outputted. Specifically, SOF (Start Of Frame) which is a first portion of CAN data is transmitted. This processing is the same as the processing in step S12 of the diagnosis processing (FIG. 3) in the first embodiment.

In step S23, it is determined whether or not a bit error occurs in the SOF. The process proceeds to step S24 when the bit error occurs in the SOF. This processing is the same as the processing in step S13 of the diagnosis processing (FIG. 3) in the first embodiment.

In step S24, it is confirmed that the transmission stop function is normal. The transmission of CAN data must be stopped by the voltage abnormality detection signal outputted in step S21. Therefore, in the same way as in step S14 of the diagnosis processing (FIG. 3) in the first embodiment, due to the bit error in the SOF, it is possible to confirm that the CAN data transmission stop function operates normally.

In step S25, the output of the diagnostic signal is stopped. In this way, the pseudo abnormality in the power supply voltage supplied from power supply IC 7 is cancelled.

In step S26, the transmission stop control is requested to monitor IC 4. This processing is the same as the processing in step S11 of the diagnosis processing (FIG. 3) in the first embodiment.

In step S27, in the same manner as in step S22, a 1-bit dominant level is outputted.

In step S28, in the same manner as in step S23, it is determined whether or not a bit error occurs in an SOF area. The process proceeds to step S29 when the bit error occurs in the SOF area.

In step S29, it is confirmed that the transmission stop function is normal. This processing is the same as the processing in step S14 of the diagnosis processing (FIG. 3) in the first embodiment.

In FIG. 30, cancel of the transmission stop control is requested to monitor IC 4. This processing is the same as the processing in step S15 of the diagnosis processing (FIG. 3) in the first embodiment.

On the other hand, the process proceeds to step S31 when the bit error does not occur in the SOF area in step S23, and it is confirmed that the transmission stop function is abnormal. In step S32, the output of the diagnostic signal is stopped, and, in step S33, a warning request is transmitted. The processing in step S32 is the same as the processing in step S25, and the processing in step S33 is the same as the processing in step S18 of the diagnosis processing (FIG. 3) in the first embodiment.

In addition, the process proceeds to step S34 when the bit error does not occur in the SOF area in step S28, and it is confirmed that the transmission stop function is abnormal. Then, in step S35, cancel of the transmission stop control is requested to the monitor IC 4, and, in step S36, a warning request is transmitted. This processing in steps S35 and S36 is the same as the processing in steps S17 and S18 of the diagnosis processing (FIG. 3) in the first embodiment.

Also in this embodiment, in the same manner as in the first embodiment, it is possible to reliably check whether or not the CAN data transmission stop function operates properly, and an abnormality is notified to a user or the like when there is the abnormality in the CAN data transmission stop function, so that immediate action to deal with the abnormality of the transmission stop function can be taken.

In particular, in this embodiment, the transmission of CAN data to communication bus 10 is stopped by the voltage abnormality detection signal outputted from power supply voltage monitor circuit 8 and the CAN data transmission stop function is further diagnosed by using the voltage abnormality detection signal outputted from the power supply voltage monitor circuit 8, so that it is possible to perform more reliable diagnosis of the CAN data transmission stop function.

In addition, in the above embodiment, the CAN data transmission stop function is firstly diagnosed by using the voltage abnormality detection signal (transmission stop signal) from power supply voltage monitor circuit 8 (steps S21 to S25, and steps S31 to S33), and then the CAN data transmission stop function is diagnosed by using the transmission stop signal from monitor IC 4 (steps S26 to S30 and S34 to S36).

However, it is not limited to this. The diagnosis of the CAN data transmission stop function by using the transmission stop signal from monitor IC 4 may be performed first. Alternatively, the diagnosis of the CAN data transmission stop function by using the voltage abnormality detection signal (transmission stop signal) from the power supply voltage monitor circuit 8 and the diagnosis of the CAN data transmission stop function by using the transmission stop signal from monitor IC 4 may be performed separately from each other.

Also in this embodiment, in the same manner as in the first embodiment, of course, main CPU 2 may output the transmission stop signal instead of, or in addition to, the output of the transmission stop signal from monitor IC 4 (step S26).

In the embodiments described above, a warning request is transmitted when there is an abnormality in the CAN data transmission stop function, but no other special fail-safe control or the like is performed. This is because, even when there is an abnormality in the CAN data transmission stop function, CAN data can be transmitted and the abnormality hardly affects various controls based on CAN data. In other words, even when there is an abnormality in the CAN data transmission stop function, it is sufficient to transmit a warning request and it is not necessary to add any other special control or change usual control. Of course, such addition or change of control is not prevented.

According to the vehicle control device of the present invention, diagnosis of the transmission stop function that stops transmission of CAN data to the communication bus is performed, so that immediate action to deal with an abnormality can be taken when there is the abnormality in the transmission stop function. In this way, for example, probability of occurrence that the CAN data is transmitted to other control devices when CAN data should not be transmitted can be largely reduced.

The entire contents of Japanese Patent Application No. 2010-065762, filed Mar. 23, 2010, are incorporated herein by reference.

While only selected embodiments have been chosen to illustrate the present invention, it will be apparent to those skilled in the art from this disclosure that various change and modification can be made herein without departing from the scope of the invention as defined in the appended claims.

Furthermore, the foregoing descriptions of the embodiments according to the present invention are provided for illustration only, and not for the purpose of limiting the invention as defined by the appended claims and their equivalents.

What is claimed is:

1. A vehicle control device that is communicably connected to other control devices so that controller area network communication can be performed through a communication bus, the vehicle control device comprising:
    a controller area network data transmission unit that can generate and transmit controller area network data;
    a transmission stop unit that stops transmission of the controller area network data transmitted from the controller area network data transmission unit to the communication bus when a transmission stop signal is inputted;
    an abnormality detection unit that outputs the transmission stop signal to the transmission stop unit when detecting an abnormality in the vehicle control device; and
    a diagnostic unit that causes the abnormality detection unit to output the transmission stop signal regardless of detection of abnormality in the vehicle control device, causes the controller area network data transmission unit to transmit the controller area network data, and diagnoses a transmission stop function that stops the transmission of the controller area network data to the communication bus on the basis of a result of comparison between the transmitted controller area network data and data on the communication bus based on the presence or absence of a bit error in a start-of-frame area,
    wherein the diagnostic unit determines that the transmission stop function is normal when a bit error occurs in the start-of-frame area, and determines that the transmission stop function is abnormal when a bit error does not occur in the start-of-frame area.

2. The vehicle control device according to claim 1, comprising:
a main central processing unit as the controller area network data transmission unit that contains a controller area network controller performing a communication control in accordance with a controller area network protocol, controls drive of an actuator connected to the vehicle control device, and generates and transmits controller area network data;
a controller area network driver as the transmission stop unit that is provided between the main central processing unit and the communication bus and stops transmission of the controller area network data transmitted from the main central processing unit to the communication bus when a transmission stop signal is inputted; and
a sub central processing unit as the abnormality detection unit that monitors an operation state of the main central processing unit and outputs the transmission stop signal to the controller area network driver when detecting an operation abnormality of the main central processing unit,
wherein the main central processing unit has a function as the diagnostic unit, outputs a request signal to the sub central processing unit to cause the sub central processing unit to output the transmission stop signal, transmits controller area network data, and diagnoses the transmission stop function on the basis of a result of comparison between the transmitted controller area network data and data on the communication bus.

3. The vehicle control device according to claim 2, wherein the main central processing unit has a function as the abnormality detection unit and is configured to output the transmission stop signal to the controller area network driver when detecting an operation abnormality of the sub central processing unit, and
the main central processing unit outputs the transmission stop signal regardless of the detection of an operation abnormality of the sub central processing unit, transmits controller area network data, and diagnoses the transmission stop function on the basis of a result of comparison between the transmitted controller area network data and data on the communication bus.

4. The vehicle control device according to claim 2, further comprising:
a power supply voltage supply circuit that supplies a power supply voltage to the main central processing unit and the sub central processing unit, and;
a power supply voltage monitor circuit as the abnormality detection unit that monitors the power supply voltage supplied from the power supply voltage supply circuit and outputs the transmission stop signal to the controller area network driver when detecting a power supply voltage abnormality,
wherein the main central processing unit outputs a second request signal different from the request signal to the power supply voltage monitor circuit to cause the power supply voltage monitor circuit to output the transmission stop signal, transmits controller area network data, and diagnoses the transmission stop function on the basis of a result of comparison between the transmitted controller area network data and data on the communication bus.

5. The vehicle control device according to claim 4, wherein the second request signal is a signal that causes the abnormality in the power supply voltage monitored by the power supply voltage monitor circuit.

6. The vehicle control device according to claim 1, wherein the controller area network data transmission unit transmits the generated controller area network data to at least one of the other control devices at a predetermined cycle.

7. A vehicle control device that is communicably connected to other control devices so that controller area network communication can be performed through a communication bus, the vehicle control device comprising:
a controller area network data transmission means capable of generating and transmitting controller area network data;
a transmission stop means for stopping transmission of the controller area network data transmitted from the controller area network data transmission means to the communication bus when a transmission stop signal is inputted;
an abnormality detection means for outputting the transmission stop signal to the transmission stop means when detecting an abnormality in the vehicle control device; and
a diagnostic means for causing the abnormality detection means to output the transmission stop signal regardless of detection of abnormality in the vehicle control device, causing the controller area network data transmission means to transmit the controller area network data, and performing diagnosis of a transmission stop function that stops the transmission of the controller area network data to the communication bus on the basis of a result of comparison between the transmitted controller area network data and data on the communication bus based on the presence or absence of a bit error in a start-of-frame area,
wherein the diagnostic unit determines that the transmission stop function is normal when a bit error occurs in the start-of-frame area, and determines that the transmission stop function is abnormal when a bit error does not occur in the start-of-frame area.

8. A diagnostic method of a vehicle control device that is communicably connected to other control devices so that controller area network communication can be performed through a communication bus, the vehicle control device including a controller area network data transmission unit that can generate and transmit controller area network data, a transmission stop unit that stops transmission of the controller area network data transmitted from the controller area network data transmission unit to the communication bus when a transmission stop signal is inputted, and an abnormality detection unit that outputs the transmission stop signal to the transmission stop unit when detecting an abnormality in the vehicle control device,
the diagnostic method of the vehicle control device comprising:
causing the abnormality detection unit to output the transmission stop signal regardless of detection of abnormality in the vehicle control device and stopping the transmission of the controller area network data to the communication bus;
causing the controller area network data transmission unit to transmit the controller area network data while stopping the transmission of the controller area network data to the communication bus; and
performing diagnosis of a transmission stop function that stops the transmission of the controller area network data to the communication bus on the basis of a result of comparison between the controller area network data transmitted by the controller area network data transmission unit and data on the communication bus based on the presence or absence of a bit error in a start-of-frame area, wherein it is determined that the transmission stop function is normal when a bit error occurs in the start-of-frame area, and it is determined that the transmission stop function is abnormal when a bit error does not occur in the start-of-frame area.

\* \* \* \* \*